United States Patent

[11] 3,624,472

| [72] | Inventor | Donald E. Graham<br>Kettering, Ohio |
|---|---|---|
| [21] | Appl. No. | 79,465 |
| [22] | Filed | Oct. 9, 1970 |
| [45] | Patented | Nov. 30, 1971 |
| [73] | Assignee | General Motors Corporation<br>Detroit, Mich. |

[54] CYCLOCONVERTER MOTOR SYSTEM
2 Claims, 7 Drawing Figs.

[52] U.S. Cl. .................................................. 318/227,
318/225, 318/230, 321/60, 321/65, 321/66
[51] Int. Cl. .............................................. H02p 5/40,
H02m 1/08, H02m 7/44
[50] Field of Search .................................... 318/138,
227, 230, 231, 225; 321/7, 60, 65, 66, 69

[56] References Cited
UNITED STATES PATENTS
| 3,178,630 | 4/1965 | Jessee............................ | 321/65 X |
| 3,418,550 | 12/1968 | Kolatorowicz et al. .......... | 318/138 |
| 3,493,838 | 2/1970 | Gyugyi et al................... | 321/69 X |

Primary Examiner—Gene Z. Rubinson
Attorneys—E. W. Christen and C. R. Meland

ABSTRACT: A cycloconverter motor system which includes 18 controlled rectifiers and 18 diodes connected to provide six unidirectionally conductive bridge rectifier switching means for supplying a three-phase AC induction motor from a three-phase AC source. The induction motor is provided with two identical three-phase windings, each of which is comprised of three identical electrically isolated windings. Each of the six windings is connected with a respective one of the six unidirectionally conductive switching means. In this manner, each phase winding is comprised of two identical windings which are energized by their respective unidirectionally conductive switching means sequentially to provide oppositely directed magnetic fields and motor operation.

CYCLOCONVERTER MOTOR SYSTEM

This invention relates to a cycloconverter motor system wherein 18 diodes and 18 controlled rectifiers are utilized to provide unidirectionally conductive switching means for supplying an AC induction motor.

Known three-phase cycloconverter systems have utilized 36 controlled rectifiers to provide full-wave rectification of power from an AC voltage source to drive an AC induction motor. In these prior art cycloconverter systems, groups of six controlled rectifiers connected in full-wave bridge configurations are simultaneously gated conductive to provide unidirectional current to the motor phase windings. Three-phase operation of the motor is obtained by connecting two groups of controlled rectifiers with each phase of the motor. In a three-phase system, sequential switching of the six groups of controlled rectifiers will result in induction motor operation wherein each phase winding is sequentially and periodically provided unidirectional current in each direction.

In the cycloconverter of the instant invention, diodes are substituted for 18 of 36 of the controlled rectifiers required in prior art cycloconverter systems, but the system is so arranged that even when using diodes, short-circuiting in the system is prevented. In this manner, the cycloconverter is used to power a three-phase AC induction motor provided with two sets of identical electrically isolated phase windings. Each of the six windings which comprise the two sets of identical phase windings is connected with a respective unidirectionally conductive switching means of the 18 controlled rectifier 18 diode cycloconverter. Each phase of the three-phase AC induction motor includes two electrically isolated windings which are energized by their respective unidirectionally conductive switching means to provide oppositely directed magnetic fields. Accordingly, when all six windings are sequentially energized by the cycloconverter arrangement, motor operation results.

It is an object of the present invention to provide a cycloconverter motor system wherein the controlled rectifiers of the various unidirectionally conductive switching means are fully isolated to preclude short-circuiting which might otherwise occur in conventional systems between controlled rectifiers of diverse switches as a result of misfire or prolonged inductive discharge.

It is another object of the present invention to provide a three-phase cycloconverter motor system which includes 18 controlled rectifiers and 18 diodes wherein the phase windings of the motor are isolated to prevent short-circuiting in the system.

Additional objects and advantages of this invention will be apparent in light of the description presented herein. The following figures which are incorporated in the description disclose a preferred embodiment of the present invention.

Figure 1:
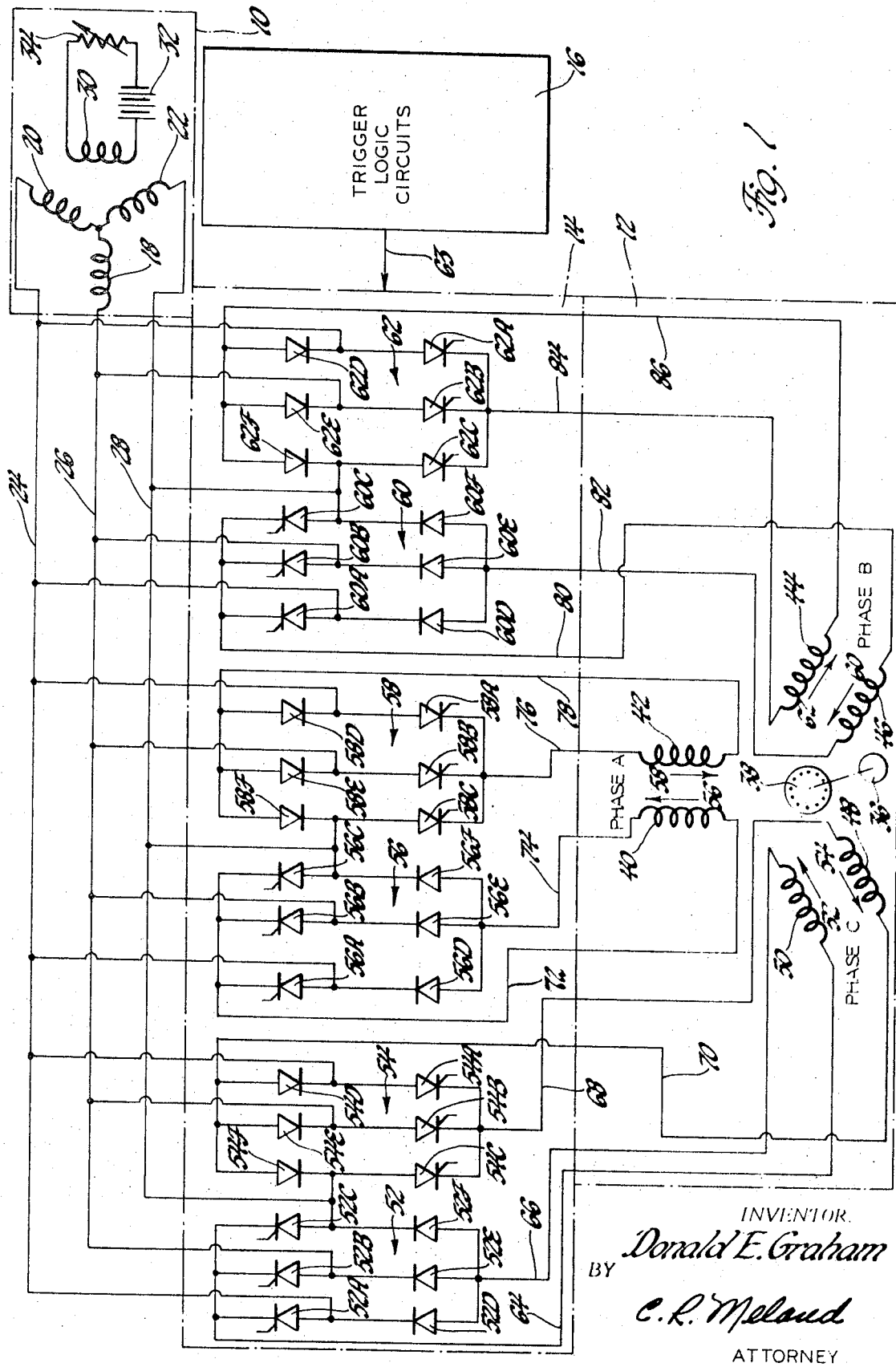
FIG. 1 is a circuit schematic of the cycloconverter motor system of this invention.

Referring now to the drawings and more particularly to FIG. 1, a motor drive system is shown wherein a source of AC voltage 10 supplies power to drive an AC induction motor 12 through a cycloconverter arrangement 14 which is controlled by trigger logic circuits 16 which are more completely set forth in FIGS. 2–6 and described hereinafter.

The source of AC voltage 10 is an alternator having three Y-connected phase windings 18, 20 and 22 which provide three-phase AC voltage to conductors 24, 26, and 28. This alternator has a rotor of conventional construction which is not illustrated. The field circuit of this alternator comprises a field winding 30, a source of DC voltage 32, and a variable resistance element 34 by which the alternator output voltage can be regulated.

The AC induction motor 12 in FIG. 1 drives a load 36 which is connected to the motor's squirrel cage rotor 38. This three-phase motor is provided with six independent identical electrically isolated windings 40, 42, 44, 46, 48, and 50. These windings are arranged on the motor to provide a three-phase winding wherein each phase is comprised of two of the above six windings 40 to 50. Thus, windings 40 and 42 are wound on the stator to form phase A, windings 44 and 46 form phase B, and windings 48 and 50 form phase C. It should be appreciated that these pairs of windings are positioned on the induction motor stator in a manner such that the requisite three-phase relationship recited will result when they are properly energized.

The cycloconverter arrangement 14 comprises six full-wave bridge rectifier unidirectionally conductive switching means generally denoted 52, 54, 56, 58, 60, and 62 in FIG. 1. Each of these unidirectionally conductive switching means has AC input terminals and a pair of DC output terminals and each switching means is comprised of three diodes and three controlled rectifiers connected in a three-phase full-wave bridge. The trigger logic circuits 16 of FIG. 1 provide control means to sequentially switch the six unidirectionally conductive switching means 52 to 62. In the particular arrangement shown in FIG. 1, this control means takes the form of a source of gate signals which switches the controlled rectifiers of the various switching means. A single gate lead 63 is shown in FIG. 1 connected with the trigger logic 16; it is noted that 18 control connections are required between the trigger logic 16 and the 18 controlled rectifiers of the cycloconverter 14 to effect the requisite switching. These trigger logic circuits 16 are more adequately set forth in FIGS. 2–6 which are discussed hereinafter.

Figure 2:
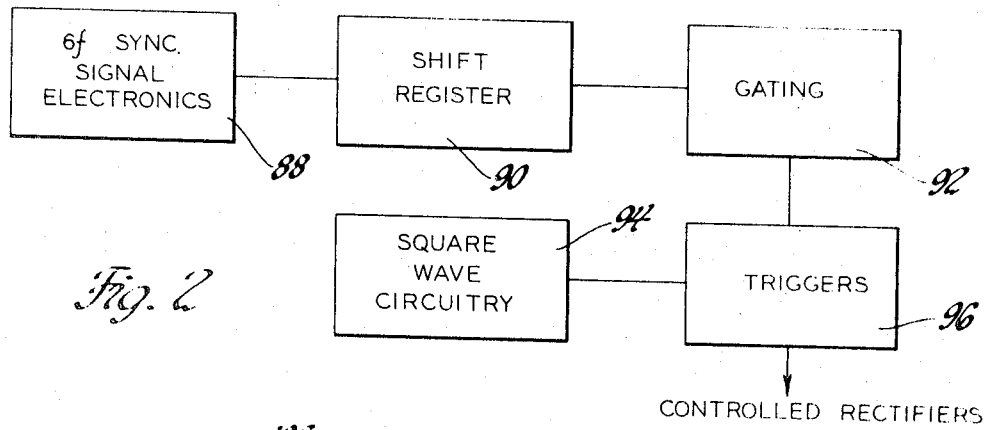
FIG. 2 is an expanded block diagram of the trigger logic circuits shown in block form in FIG. 1.

The cycloconverter arrangement 14 of FIG. 2 includes 18 controlled rectifiers and 18 conventional diodes. These controlled rectifiers and diodes are serially connected to provide 18 controlled rectifier-diode pairs wherein the diode's cathode is connected with the controlled rectifier's anode. These 18 serially connected pairs are separated into six groups of three, which groups are generally identified as the unidirectionally conductive switching means 52 through 62 in FIG. 1 as cited above.

The controlled rectifiers of each of the six groups of switching means are provided with the numeric index of their group and a further index A, B, or C to distinguish the three controlled rectifiers of each group. Likewise, the three diodes of each group are provided with the numeric index of their respective group and the further index D, E, or F to distinguish the three diodes of each group. A respective serially connected diode-controlled rectifier pair of each of the six groups is connected with each of the three conductors 24, 26, and 28. Thus, it is seen that the junction of the cathode of diode 52D and the anode of controlled rectifier 52A is connected with conductor 24 as are all the remaining diode cathode-controlled rectifier anode junctions wherein the diode bears an alphabetic index D and the controlled rectifier carries an alphabetic index A. In like manner, conductor 26 is connected with the cathode-anode junctions of all diodes carrying alphabetic index E and all controlled rectifiers carrying alphabetic index B. Similarly, conductor 28 of the three-phase source 10 is connected with the cathode-anode junctions wherein the diode is denoted by an alphabetic index F and the controlled rectifier is denoted by an alphabetic index C. As noted above, the gate and cathode electrodes of each controlled rectifier are connected with a gate firing circuit included in the trigger logic 16.

Each of the unidirectionally conductive switching means provides a pair of DC output terminals for connection with one of the motor windings 40 to 50. Thus, the switching means denoted 52 provides a DC output connected with the winding 50 wherein positive voltage is available on conductor 64 and negative voltage is available on conductor 66. In like manner, the switching means generally denoted 54 provides DC power to winding 48 wherein the voltage on conductor 68 has a positive polarity and the voltage on conductor 70 has a negative polarity. In a similar manner, the switching means 56, 58, 60, and 62 provide DC outputs with positive polarities on conductors 72, 76, 80, and 84 and negative polarities on conductors 74, 78, 82, and 86.

As seen in FIG. 1, and noted above, the various windings of the AC induction motor 12 are connected with the DC output terminals of the various switching means by the conductors 64 to 86. Considering phase A, it will be appreciated that winding 40 is supplied DC power through conductors 72 and 74 by the switching means 56 when the controlled rectifiers 56A, 56B, and 56C are gated conductive. The sense or direction of this current is represented in FIG. 1 by an arrow having the notation 56 at its tail. In a similar manner, it should be appreciated that winding 42 of phase A will receive a DC current during that period of time in which controlled rectifiers 58A, 58B, and 58C are conductive. The sense of this current is represented by an arrow with the notation 58 at its tail. In a similar manner, currents are supplied to the windings in phases B and C by the remaining switching means. The senses of the various currents are represented in FIG. 1 by arrows and the arrows are keyed to the various switching means by use of the numeric index of the particular switching means at the tail of the respective arrow.

The DC currents applied to the various windings of the motor 12 are full-wave rectified by the switching circuits 52 to 62 which form three-phase full-wave bridge rectifier networks interposed between the induction motor 12 and the source of AC voltage 10. It is noted that the senses of the currents in the two windings of each of the phase windings A, B and C have opposite directions. This is illustrative of the fact that the DC currents applied to the two windings of each phase winding cause identical but oppositely directed magnetic fields in the induction motor. These resultant identical and oppositely directed magnetic fields are the same as would result if each phase winding were comprised of a single winding and oppositely directed currents were applied to it.

Sequential switching of the various controlled rectifiers is effected by the trigger logic circuits 16. In view of the fact that the controlled rectifiers are fed from an AC source, it should be appreciated that commutation to terminate a conduction period is inherent. Accordingly, trigger signals are applied for the precise conductive period required and commutation follows upon the removal of the gate signal. It is noted, however, that in view of the three-phase character of the source of AC voltage, the three controlled rectifiers of any group do not cease conduction simultaneously but rather conduction terminates as the respective voltages applied to the three controlled rectifiers assume negative values. Thus, the three controlled rectifiers are consecutively shut off in accordance with the waveforms of the three-phase voltages applied to the respective controlled rectifiers.

Referring now to FIG. 2, the trigger logic circuits 16 of FIG. 1 are represented in block diagram form including 6$f$ sync signal electronics 88, shift register 90, a gating control 92, a pair of square wave oscillators represented as a square wave circuitry block 94, and 18 trigger outputs represented as triggers 96. These trigger logic circuits cooperate to determine the switching sequence of the controlled rectifiers of the cycloconverter arrangement 14 of FIG. 1. The shift register 90 of FIG. 2 is shown more completely in FIG. 3 and discussed below. The gating arrangement 92 of FIG. 2 is shown in more detail in FIG. 4 and further discussed hereinafter. The trigger circuits 96 are more specifically shown in FIG. 5 and are discussed below.

Figure 3:
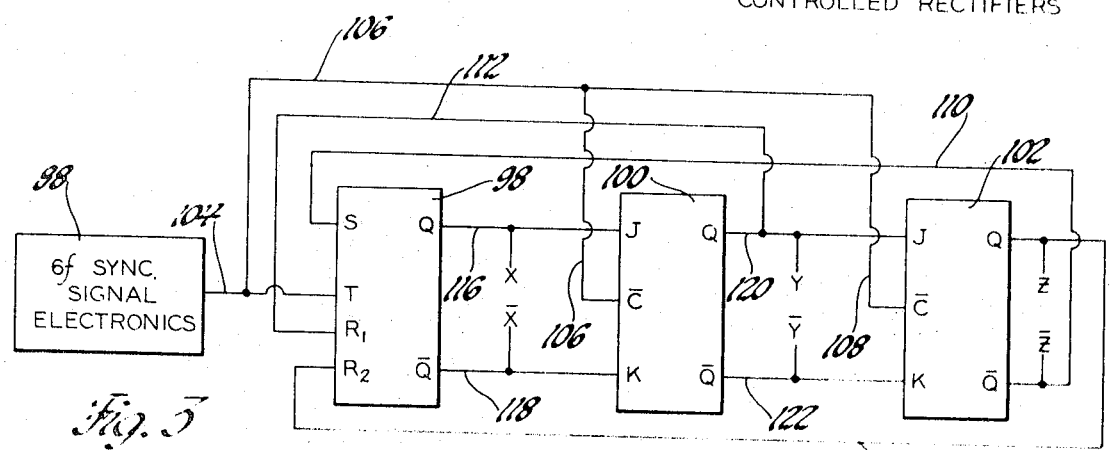
FIG. 3 is a block representation of the sync signal electronics and the shift register blocks shown in FIG. 2.

Referring now to FIG. 3, the shift register 90 of FIG. 2 is shown in greater detail. In FIG. 3, the 6$f$ sync signal electronics 88 provides a square wave signal shown in FIG. 6 and there denoted 6$f$ sync signal 88 which is related to the frequency of operation of the motor drive system by a factor of six. Thus, it is appreciated that in operation the 6$f$ sync signal waveform of FIG. 6 completes six cycles for each complete cycle of the cycloconverter 14. This signal from the sync signal electronics 88 provides an input to the shift register in FIG. 3. The shift register includes integrated flip-flops 98, 100, and 102. These three integrated flip-flops are of a conventional design which is commercially available. A representative manufacturers designation is that of Fairchild which is DT$\mu$L 984.

The three flip-flops 98, 100, and 102 of FIG. 3 provide six essential output signals X, $\overline{X}$, Y, $\overline{Y}$, Z, and $\overline{Z}$ at terminals designated by these letters. The three signals X, Y and Z are shown graphically in FIG. 6 and are there denoted X, Y and Z. The three additional signals $\overline{X}$, $\overline{Y}$ and $\overline{Z}$ are merely the inverse of the three signals X, Y and Z and are not shown. It should be appreciated, however, that $\overline{X}$ is readily derived from X by merely inverting the X graph of FIG. 6. Thus $\overline{X}$ has a low level when X has a high level and $\overline{X}$ has a high level when X has a low level. Similarly, $\overline{Y}$ and $\overline{Z}$ are merely the inverse of the Y and Z graphs of FIG. 6.

In operation, conductor 104 connects the output of the 6$f$ sync electronics 88 with input T of the flip-flop 98. Conductors 106 and 108 connect the output from the 6$f$ sync electronics to the $\overline{C}$ inputs of flip-flops 100 and 102. Conductor 110 connects the S input of flip-flop 98 with the $\overline{Q}$ output of flip-flop 102. Input $R_1$ of flip-flop 98 is connected by conductor 112 with output Q of flip-flop 100. Input $R_2$ of flip-flop 98 is connected by conductor 114 with output Q of flip-flop 102. Conductor 116 connects output Q of flip-flop 98 with input J of flip-flop 100. Similarly, output $\overline{Q}$ of flip-flop 98 is connected with input K of flip-flop 100 by conductor 118. In a like manner, the outputs Q and $\overline{Q}$ of flip-flop 100 are connected by conductors 120 and 122 with the inputs J and K of flip-flop 102 respectively. In this manner, the desired signals X, $\overline{X}$, Y, $\overline{Y}$, Z, and $\overline{Z}$ are derived from the shift register comprising flip-flops 98, 100, and 102. These signals are available at the outputs of the various flip-flops as shown in FIG. 3.

Figure 4:
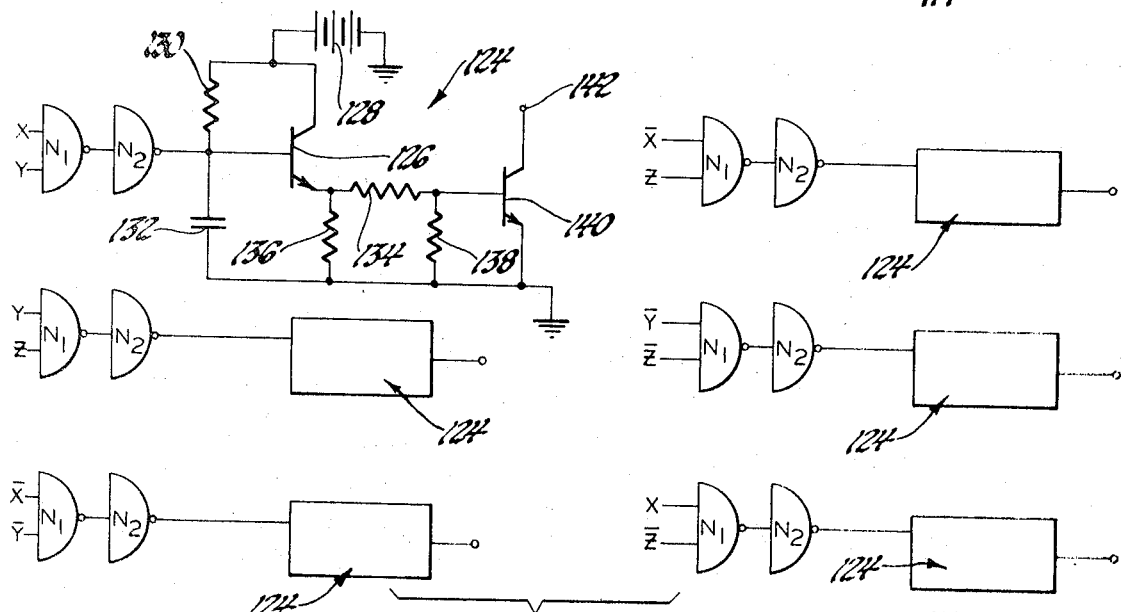
FIG. 4 is a circuit schematic of the gating block shown in FIG. 2.

Referring now to FIG. 4, six circuits are shown which provide gating signals for the six groups of controlled rectifiers of FIG. 1. These gating means are represented in the FIG. 2 block diagram by the gating block 92. In FIG. 4, six identical circuits are required; only one circuit is shown and explained in detail.

The detailed circuit schematic of FIG. 4 includes a two input NAND-gate $N_1$, a single input NAND-gate $N_2$, and a transistor switching means generally designated 124.

The six signals developed by the shift register shown in FIG. 3 and described above are used as control signals in the FIG. 4 gating circuits. In this regard, the output terminals X, $\overline{X}$, Y, $\overline{Y}$, Z, and $\overline{Z}$ of the flip-flops shown in FIG. 3 are connected by conductors (not illustrated) with terminals of like designation in FIG. 4. Thus, each gating circuit of FIG. 4 is connected with two of the six shift register signals developed in the shift register of FIG. 3.

Figure 6:
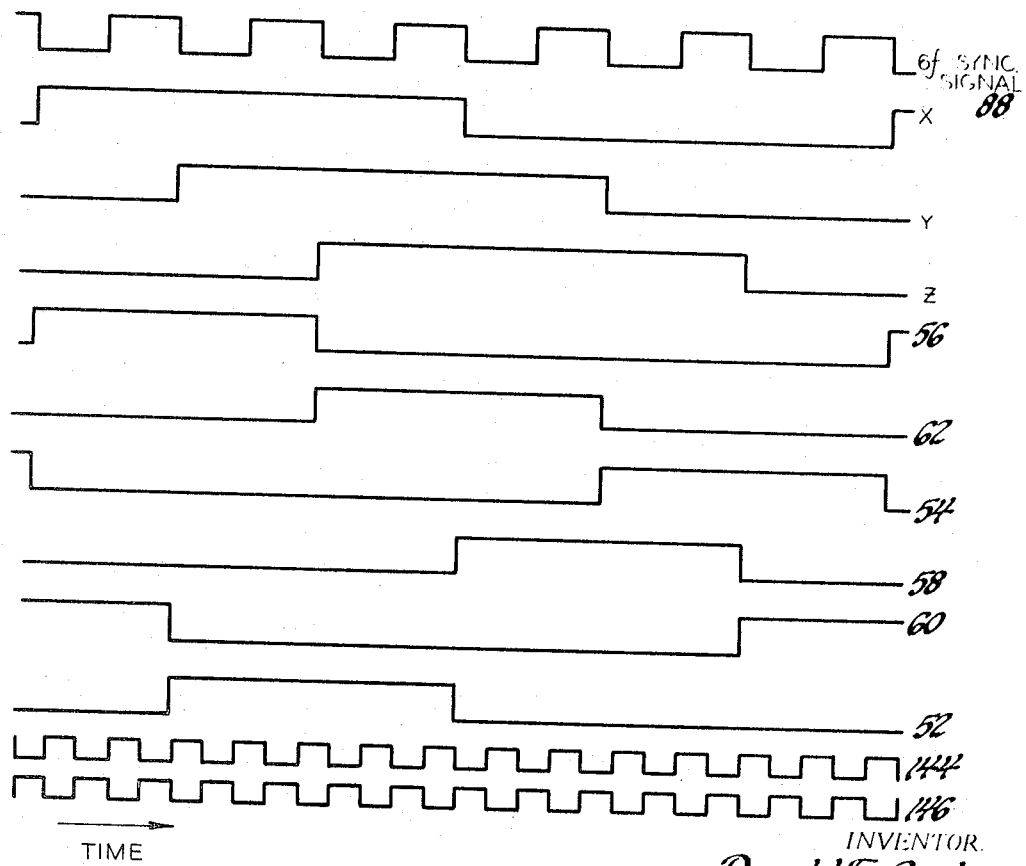
FIG. 6 is a set of curves which disclose the operative relationships of the various facets of the block diagram shown in FIG. 2.

Considering the operation of the gating circuit shown in detail, it is noted that the shift register signals X and Y shown in FIG. 6 are connected with the two inputs of its NAND-gate $N_1$. Accordingly, the output of NAND-gate $N_1$ is at its low output level only during that period of time in which the inputs X and Y are both at their high level. When the output from the NAND-gate $N_1$ is at its high level, the output from NAND-gate $N_2$ is at its low output level and the output from NAND-gate $N_2$ is at its high level when the output from NAND-gate $N_1$ is at its low level. Transistor 126 is rendered conductive when the output from NAND-gate $N_2$ assumes its high output level. Thus, the transistor 126 is conductive only during those time intervals when the inputs X and Y are both at their high level.

The source of DC voltage 128 provides power to transistor 126 and it also provides DC base bias to transistor 126 in conjunction with resistor 130 and capacitor 132. The resistor network comprising resistors 134, 136, and 138 provides a load for transistor 126 and it provides base bias voltage to transistor 140 when transistor 126 is conductive. Thus, it is seen that transistor 140 is biased conductive when transistor 126 is operating in its conductive mode. In this manner, a conductive path from terminal 142 through transistor 140 to ground is completed when X and Y are both at their high levels causing both the transistors 126 and 140 to be conductive. The function of this conductive path is more fully developed hereinafter in conjunction with the explanation of the trigger circuitry of FIG. 5.

Each of the six gating circuits shown in FIG. 4 is identical with the one illustrated in detail and explained above. The various input waveforms are time displaced and, accordingly, the conductive character of the respective output transistors is time displaced among the six gating circuits. Accordingly, the gating circuits provide sequentially conductive output transistors.

Figure 5:
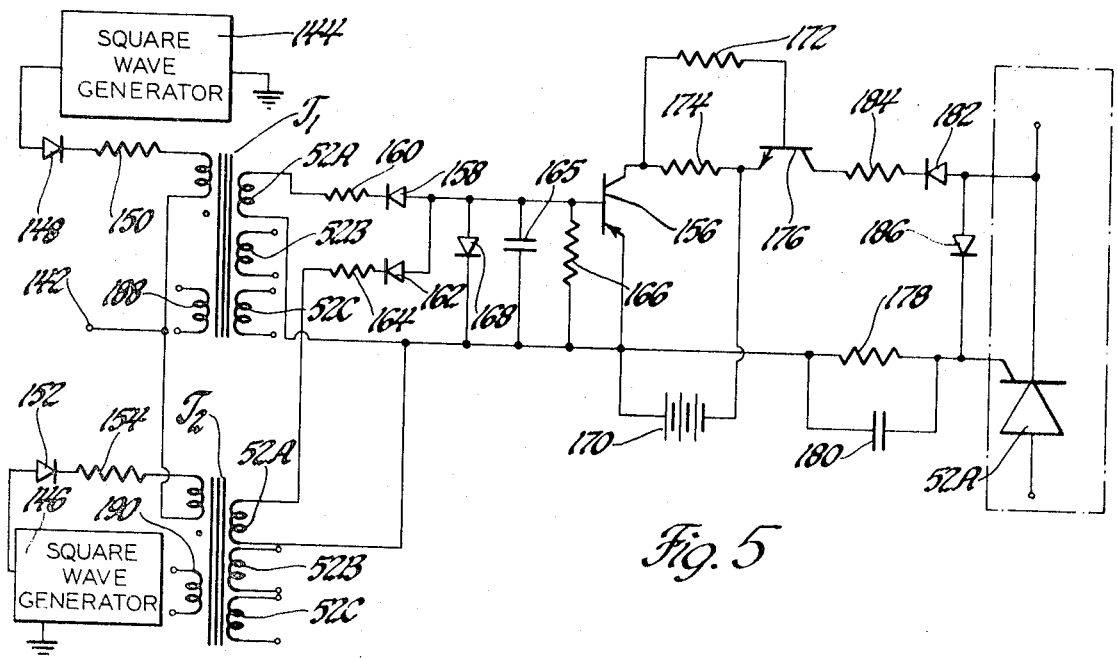
FIG. 5 is a circuit schematic of one of the 18 triggers represented by the trigger block of FIG. 2.

Referring now to FIG. 5, a trigger circuit is disclosed wherein gating signals are provided controlled rectifier 52A of FIG. 1. To obtain the operation described above for FIG. 1, controlled rectifiers 52B and 52C are required to be conductive concurrently with controlled rectifier 52A and, therefore, are provided trigger signals concurrently with controlled rectifier 52A. The trigger circuits (not shown) for controlled rectifiers 52B and 52C are identical to that shown in FIG. 5 for controlled rectifier 52A. These two trigger circuits are connected with the 52B and 52C secondary windings of transformers $T_1$ and $T_2$. Eighteen trigger circuits identical to that shown in FIG. 5 are included in the triggers' block 96 of FIG. 2 to trigger the 18 controlled rectifiers of the cycloconverter 14.

In operation, two square wave generators 144 and 146 of FIG. 5 are connected through serially connected diode resistor combinations with primary transformer windings of two transformers $T_1$ and $T_2$. Square wave generator 144 is connected to the primary winding of transformer $T_1$ through diode 148 and resistor 150, while square wave generator 146 is connected to the primary winding of transformer $T_2$ through diode 152 and resistor 154. The diodes constrain the circuit operation such that only unidirectional currents are possible.

Terminal 142 in FIG. 5 is the same as terminal 142 of the output transistor of the detailed gating circuit shown in FIG. 4. Thus, current can flow in the respective transformer primary windings only when transistor 140 of FIG. 4 is in its conductive mode, which condition is constrained to specified time intervals as described above.

The respective square wave signals from the two square wave generators of FIG. 5 are shown graphically in FIG. 6 and are there denoted 144 and 146 to correspond with their respective generators. In practice, these square wave signals will have a frequency substantially greater than that shown in FIG. 6. The selection is dictated by practical considerations associated with transformer size, low frequency signals being more difficult to couple through the transformer. It is noted that the two waveforms 144 and 146 of FIG. 6 are identical to each other but are phase shifted 180° with respect to each other.

The trigger circuit shown in FIG. 5 includes a pair of secondary windings denoted 52A to agree with the controlled rectifier to be controlled, one each for the two transformers $T_1$ and $T_2$. These transformer windings are connected with a rectifying and filtering network which in turn is connected with the base of transistor 156. Rectification is provided in the secondary circuit of transformer $T_1$ by the action of diode 158 and resistor 160. Rectification is provided in the secondary circuit of transformer $T_2$ by the action of diode 162 and resistor 164. Filtering is effected by capacitor 165 and resistor 166. Diode 168 is included in the base-emitter circuit of transistor 156 to ensure that the base does not assume a positive voltage level with respect to the emitter.

A source of DC voltage 170 provides bias and power for the trigger network. Resistors 172 and 174 function as load and bias resistors interconnecting transistor 156 with transistor 176. The parallel combination of resistor 178 and capacitor 180 affords fast response in the trigger circuit to facilitate turning the controlled rectifier 52A on. Diode 182 restricts current in the gate-cathode control circuit of controlled rectifier 52A such that only unidirectional current is possible. Resistor 184 provides a current limiting function. Diode 186 ensures that the cathode of controlled rectifier 52A is not positive with respect to the gate of controlled rectifier 52A.

In operation, when transistor 156 is gated conductive, transistor 176 is biased conductive and voltage is applied to the gate-cathode control circuit of controlled rectifier 52A. Considering the entire network, it is appreciated that during that time interval in which transistor 140 of FIG. 4 is in its conductive mode, both square wave generators 144 and 146 provide energization to their respective transformer primary windings. When transistor 140 is nonconductive, terminal 142 in FIG. 5 is effectively an open circuit and, accordingly, neither square wave generator is able to energize its transformer winding.

During gating intervals, voltages are induced in the secondary windings 52A of transformers $T_1$ and $T_2$ to provide a continuous direct current bias signal to the base of transistor 156. As noted above, when transistor 156 is conductive, transistor 176 is conductive and controlled rectifier 52A is provided a gate signal. As noted above, controlled rectifiers 52B and 52C are gated by circuitry connected with the transformers $T_1$ and $T_2$ which is identical to that shown and described for controlling controlled rectifier 52A. Accordingly, it should be appreciated that the three controlled rectifiers 52A, 52B and 52C are concurrently controlled in the manner described above.

Each of the six switching means 52 to 62 of FIG. 1 is controlled by trigger circuitry identical to that shown and described in FIGS. 4 and 5 for the controlled rectifiers which comprise the switching means 52. Accordingly, 18 trigger circuits requiring 12 transformers are required to control the cycloconverter of FIG. 1. Each of the 12 transformers includes one primary winding and three secondary windings for connection with the respective gate-cathode control circuits of a switching means. It is noted that each of the 12 transformers is provided a bias winding fed from a source of direct current to reset the core of its particular transformer. The core is reset by the bias winding when the square wave generator deenergizes the primary winding of the transformer, thus ensuring a fast rising pulse to fire the controlled rectifier. These bias windings are shown in FIG. 5 as windings 188 and 190 for the transformers $T_1$ and $T_2$, respectively. The direct voltage sources which energize the bias windings are not shown in the drawing.

It is noted that controlled rectifier 52A is gated for a time interval coincident with the time interval during which both signals X and Y from the shift register are at their high value. This interval is shown in FIG. 6 and indexed 52 to denote the fact that all controlled rectifiers of switch 52 in FIG. 1 are provided gate signals during this time interval. Gate signals provided the other controlled rectifiers of FIG. 1 are shown graphically in FIG. 6 and are keyed to their respective controlled rectifiers by numeric indices 52 to 62 inclusive.

Figure 7:
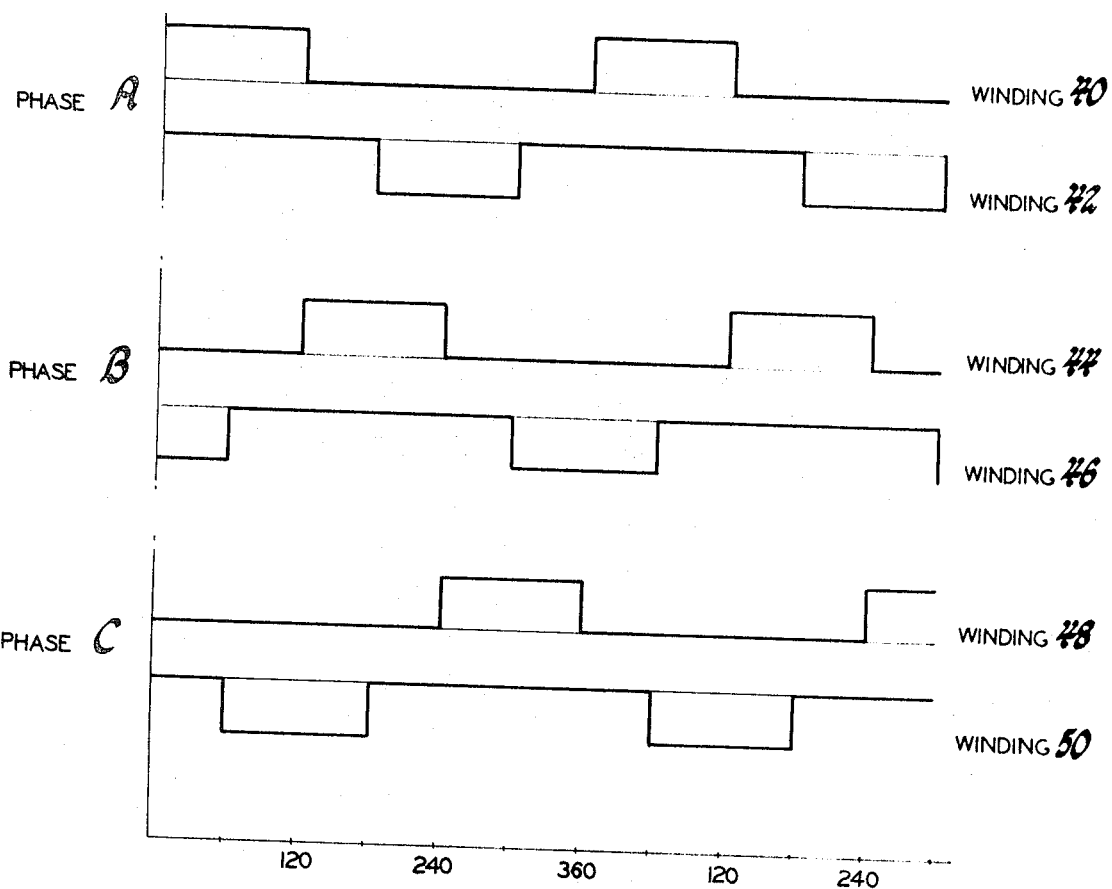
FIG. 7 shows graphically the respective conductive periods for the six windings which comprise the three-phase windings of the motor shown in FIG. 1.

Referring now to FIG. 7, the resulting energization of induction motor 12 is summarized. The three phases are denoted in FIG. 7 together with their respective energization sequence. As noted above, each of the phases includes two windings. FIG. 7 shows the respective winding energizations as well as the collective phase energizations. FIG. 7 is an ideal representation and it should be appreciated that actual waveforms deviate somewhat from those depicted due to effects of the practical circuits involved. Considering phase A, it is noted that winding 40 is provided intermittent pulses of power resulting in positive voltage pulses of 120° duration to phase A, whereas winding 42 is provided intermittent power pulses corresponding to negative voltage pulses of 120° duration to phase A. Phases B and C and their respective windings are provided intermittent power pulses in an analogous manner. The combined energization sequences of the six windings 40 to 50 of FIG. 1 provide magnetic fields of proper orientation and synchronization to effect motor operation.

Inasmuch as the 6$f$ sync signal depicted in FIG. 6 is applied to the shift register of FIG. 3 to generate the signals X, $\overline{X}$, Y, $\overline{Y}$, Z, and $\overline{Z}$, it should be appreciated that the frequency of these six signals is dependent on the frequency of the 6$f$ sync signal. Thus, the frequency of the voltage represented in FIG. 7 supplied by the cycloconverter 14 to the induction motor 12 is controlled by the frequency of the 6$f$ sync signal. This follows since the signals X, $\overline{X}$, Y, $\overline{Y}$, Z, and $\overline{Z}$ determine the sequence and frequency of switching for the switching means 52 to 62 as set forth above. Accordingly, variable frequency power subject to operator control is available from the cycloconverter 14. To vary the frequency of the power supplied the induction motor 12, it is only necessary to control the 6$f$ sync signal electronics and vary the frequency of the 6$f$ sync signal.

In summary, a three-phase AC induction motor provided with six independent electrically isolated windings is energized by a cycloconverter arrangement to obtain motor operation. The cycloconverter requires fewer controlled rectifiers than would be required if a conventional cycloconverter and induction motor were employed. In the arrangement of this invention, controlled rectifier short circuits are virtually impossible by nature of the total electrical isolation of the controlled rectifiers from each other.

The trigger circuit disclosed herein for triggering the controlled rectifiers forms no specific part of the invention and can take various forms as long as it is capable of triggering the controlled rectifiers in the proper sequence.

I claim:

1. A converter for supplying a polyphase AC induction motor from an AC source, comprising: a source of AC voltage, a polyphase AC induction motor, each phase winding of said AC induction motor comprised of a pair of windings conductively isolated from each other and from all other phase windings, a plurality of unidirectionally conductive switching means equal in number to the total number of windings, each switching means comprised of a plurality of controlled rectifiers and a plurality of diodes, each of said switching means having AC input terminals and a pair of DC output terminals, means connecting said switching means AC input terminals to said source of AC voltage, means connecting each of said windings across a respective pair of DC output terminals of said switching means, each phase winding having its pair of windings connected in a manner to provide oppositely directed magnetic fields when energized by DC voltage from their respective switching means, and control means connected to the controlled rectifiers of each switching means to sequentially switch said plurality of switching means whereby, each of said switching means sequentially provides unidirectional current to its respective winding in response to a control signal from said control means and said polyphase AC induction motor is provided polyphase AC voltage.

2. A converter for supplying AC voltage to a three-phase AC induction motor from a three phase AC source, comprising: a three-phase source of AC voltage, three supply conductors connected respectively with the three output terminals of said source of AC voltage, 18 diodes, 18 controlled rectifiers, each of said controlled rectifiers having its anode connected with the cathode of a respective diode to provide 18 serially connected diode-controlled rectifier pairs, said diode-controlled rectifier pairs grouped into six groups of three diode-controlled rectifier pairs, one of said diode-controlled rectifier pairs of each of said six groups having their anode-cathode junction connected with each of said three supply conductors such that each group of three diode-controlled rectifier pairs has one diode-controlled rectifier pair connected with each of said three supply conductors, a three-phase AC induction motor provided with two identical three-phase motor windings, each of the six-phase windings of said two identical three-phase motor windings being conductively isolated from all other phase windings, each of said six-phase windings of said induction motor having one terminal connected with the three cathodes of the controlled rectifiers of a respective one of said groups of diode-controlled rectifier pairs and its other terminal connected with the three anodes of the diodes of that group, and a source of gate signals connected with the gate-cathode circuit of each of said controlled rectifiers, said source of gate signals sequentially switching the controlled rectifiers of each of the groups whereby, three-phase AC voltage having a frequency determined by the repetition frequency of said source of gate signals is applied to said induction motor.

* * * * *